May 20, 1941.  J. ROBINSON  2,242,265

AUTOMATIC TRAIN PIPE CONNECTOR

Filed Jan. 3, 1939

INVENTOR
JOSEPH ROBINSON
BY Robb & Robb
ATTORNEY

Patented May 20, 1941

2,242,265

UNITED STATES PATENT OFFICE 2,242,265

AUTOMATIC TRAIN PIPE CONNECTOR

Joseph Robinson, New York, N. Y.

Application January 3, 1939, Serial No. 248,988

7 Claims. (Cl. 285—58)

This invention relates to automatic train pipe connectors. Among the objects is to provide an improved simple means for folding the connector head, and a part of its supporting means, back along the buffer spring out of the way of normal coupling and operation of the conventional hand operated hose. In this way connector adoption is facilitated by making it convenient to install the automatic device and delay its introduction into service until large numbers thereof can be "thrown" into use in groups practically over night, thus avoiding interchanging between connector equipped and non-connector equipped cars.

Figure 1:
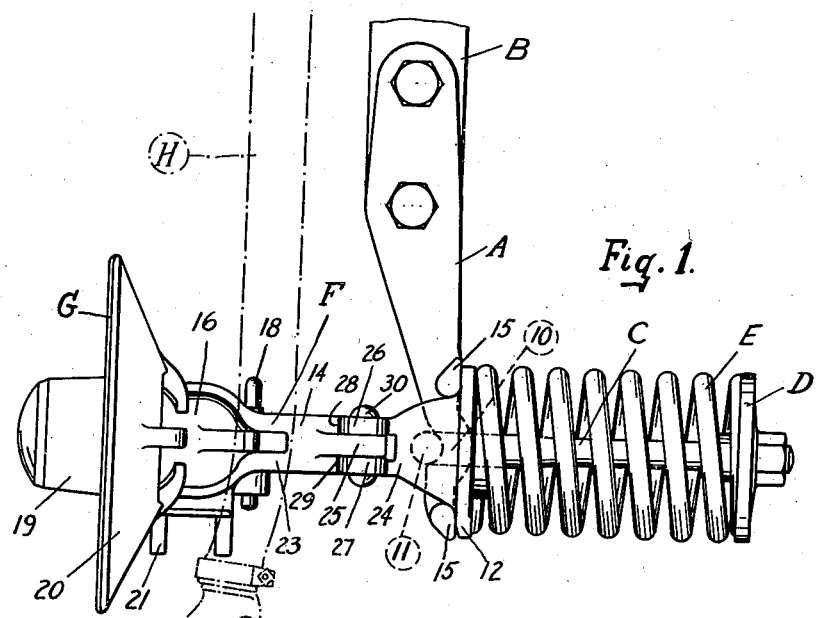
Figure 2:
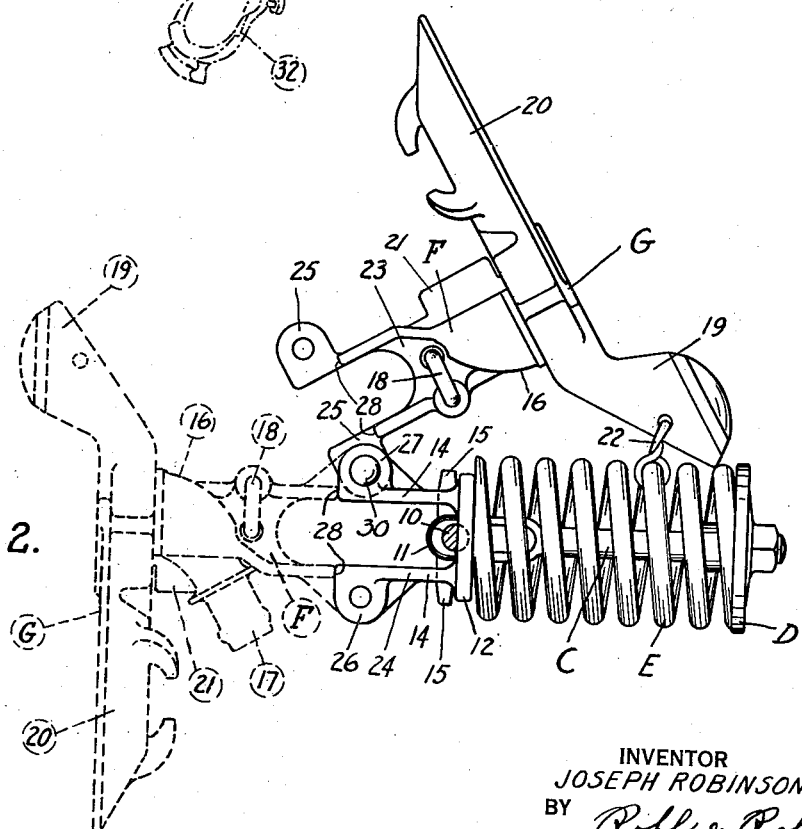

In the accompanying drawing, in which like reference characters indicate similar parts, Figure 1 is a side elevation of an automatic train pipe connector having my improvement and ready for automatic service (hose omitted); and Figure 2 is a plan view of the construction shown in Figure 1 with the connector head folded back. In this view the anchor lug 10 of the bracket A is shown in section.

My improvement includes the usual bracket A which suspends the connector from the car coupler (not shown) through the medium of the usual lug B. The lower end of the bracket is provided with an anchor lug 10 over which is hooked the front perforated end 11 of the tie rod C and on which the tie rod has universal or pivotal movement. The rod passes through the buffer spring E and adjustably receives, as by threads, the plate or abutment D against which the spring bears and by which it is supported. The front end of the spring engages the rear side of a suitable flange 12 formed integral with, or otherwise connected to, and comprising the rear end of, a supporting member or yoke F. The yoke includes a pair of laterally spaced straps 14 which span the anchor lug 10 of the bracket and lie between shoulders or positioning lugs 15 on the latter. The enlarged hollow forward end 16 of the yoke receives the gasket carrying hose fitting 17 which is removably retained in the yoke by the plunger pin 18. The coupling head G is pressed onto or is otherwise connected with the front end of the yoke and serves, through the medium of the ball and funnel gathering means 19—20, to align the fittings 17 (and their gaskets) of opposing heads. The construction, arrangement and operation of these parts are known from my existing United States patents but my present improvement distinguishes from these patents, and from the other prior art by the provision of novel means for swinging the coupling head G, and the major part of the yoke F, out of the path of the conventional hand operated hose H when the hose is coupled across into communication with a like hose of an adjoining car. It is not feasible to couple these hose under the yoke F, their length being insufficient to permit this without chafing against the bottom of the yoke. Moreover, when the car couplers "stretch" as in starting the train, the coupled hose H raise considerably. If coupled through under the yoke they would at such times pull up on the yoke causing leakage between the hose couplings or complete disconnection thereof. By swinging the head G and the forward part of the yoke F to one side, out of the way, this serious objection is obviated and the hose can be coupled through as readily, and with the same operative results, as if the connector was not on the car.

One of the problems which retard general adoption by the railroads of automatic train pipe connectors is the problem of interchange with non-connector cars during the transition period. While provision is made at 21 for carrying an efficient interchange permanently on my improved connector during this period, such device is not, of course, as convenient to operate as is the conventional hand hose H with which all cars are equipped and with the operation of which all trainmen are intimately familiar. Therefore, if cars could be equipped with automatic connectors, and those connectors folded back out of the way pending predetermined dates when large numbers of the connectors would be quickly placed in automatic service, adoption of this needed improvement would be facilitated. One of the objects of my present invention is to provide a connector with which this approach to adoption can be made. To this end I form the yoke F in two parts or halves and connect them by a powerful hinge which permits the coupling head and the forward portion of the yoke to be folded back against the buffer spring E, Figure 2, out of the way entirely. When thus folded back the head and yoke are firmly tied to the buffer spring by any suitable tie means 22, pending the time when various groups of the connectors are to be thrown quickly into full non-interchange automatic operation. The hinge referred to includes the front part 23 of the yoke F and the rear part 24 thereof. These are connected by providing the front portion 23 with perforated lugs 25 which fit closely between companion ears 27 on the rear portion 24 of the yoke. This fit, and the abutting surfaces 28—29 of the yoke are preferably machined. A vertically disposed pin or rivet 30 permanently secures the two halves of the yoke together and is relieved of undue strains by the fit of the lugs 25 between the ears 26—27 and by the abutting surfaces 28—29. The similar pin or rivet for the opposite side of the yoke is not inserted until the connector is arranged for full automatic service. This is done by returning the forward half of the yoke, and the coupling head G, to the position shown in Figure 1, inserting and securing the absent rivet or pin 30, removing the hand coupling 32 from the hose H, mounting the hose on the connector fitting 17 and inserting such fitting into the hollow front end 16 of the yoke, the plunger pin 18 removably retaining the same in place. Of course the hose H may be disconnected from the car, and a fully equipped connector hose substituted.

I am aware that connectors have been produced heretofore which may be turned to one side for the purpose of facilitating interchange. But in most if not all of those constructions the buffer spring swings with the connector and is carried into the path occupied by the hose H when coupled to a companion hose, thus largely defeating the advantage sought. But the support in none of these constructions may be "jackknifed," that is, folded back on itself to carry the connector head A out of the field occupied by the conventional train pipe hose H when the latter is coupled to a companion hose on an adjacent car. My invention not only permits the connector support to be folded back without disturbing the normal position of the buffer spring E, but enables rolling stock to be equipped with automatic connectors without introducing any lasting or serious problem of interchange. If preferred the improved connector may be installed without the hose fitting 17, the forward part 23 of the yoke F and the coupling head G, leaving these parts to be quickly applied when full automatic connector operation is desired. When ready, this operation can be had practically over night by simply applying the withheld connector parts in the rapid easy manner my improvement makes possible.

What I claim is:

1. An automatic train pipe connector comprising, in combination, a coupling head, a horizontally disposed forwardly extending supporting member for said head and to which the head is connected, resilient means urging said head forward and cooperating with said member to yieldingly support the head, a train pipe hose, and means for permitting a part of said supporting member to be folded back on itself without moving said resilient means to carry said head rearwardly out of the field occupied by said hose when the latter is coupled to a companion hose.

2. An automatic train pipe connector such as described in claim 1 in which the resilient means is a buffer spring that acts against said supporting member to yieldingly support said head, and in which the normal position of said spring is not disturbed by folding the supporting member back on itself.

3. An automatic train pipe connector such as described in claim 1, distinguished further by the provision of means for positively securing the supporting member and said head against movement relative to each other when the head is returned from the folded position to the normal coupling position.

4. An automatic train pipe connector comprising, in combination, a coupling head, a train pipe hose, and yieldable means for yieldingly supporting said head, said means including a horizontally disposed forwardly extending member which is provided intermediate its ends with a hinge to permit said member to be folded back on itself to carry said coupling head out of the field occupied by said hose.

5. An automatic train pipe connector such as described in claim 4 in which means are provided for relieving the hinge of undue strains, distinguished further by the provision of positive means for retaining the coupling head and said member in the folded position.

6. An automatic train pipe connector comprising, in combination, a bracket, a yoke spanning the bracket, a coupling head mounted on the yoke in front of the bracket, a buffer spring at the rear of the bracket and urging the yoke against said bracket to yieldingly support said head, and means permitting said head to be folded back along one side of said bracket without disturbing the normal position of said spring.

7. An automatic train pipe connector such as described in claim 6 in which the bracket is provided with an anchor lug, distinguished further by the fact that a tie rod is hooked around said lug and has rocking movement thereon, said rod being within said spring and serving to hold the spring against the yoke under pressure whereby the spring holds the yoke yieldingly against the rear side of said bracket and yieldingly supports said head when the head is folded back.

JOSEPH ROBINSON.